(12) United States Patent
Henson

(10) Patent No.: US 7,811,346 B1
(45) Date of Patent: Oct. 12, 2010

(54) FILTER HOUSING

(75) Inventor: Joseph C. Henson, Fort Washington, MD (US)

(73) Assignee: Joseph Clarence Henson, Fort Washington, MD (US)

( * ) Notice: Subject to any disclaimer, the term of this patent is extended or adjusted under 35 U.S.C. 154(b) by 954 days.

(21) Appl. No.: 11/392,078

(22) Filed: Mar. 29, 2006

Related U.S. Application Data

(63) Continuation-in-part of application No. 10/607,540, filed on Jun. 27, 2003, now abandoned.

(60) Provisional application No. 60/392,056, filed on Jun. 28, 2002.

(51) Int. Cl.
*B03C 3/30* (2006.01)

(52) U.S. Cl. ............... 55/385.1; 55/385.2; 55/481; 55/484; 55/506; 55/493; 55/501; 55/521; 55/DIG. 29; 55/DIG. 31; 55/DIG. 35; 55/496; 210/493.1; 210/493.3; 200/61.51; 200/61.52

(58) Field of Classification Search ............... 55/385.1, 55/385.2, 481, 484, 506, 493, DIG. 29, DIG. 31, 55/496, 501, 521, DIG. 35; 210/493.1, 493.3; 200/61.51, 61.52
See application file for complete search history.

(56) References Cited

U.S. PATENT DOCUMENTS

| | | | |
|---|---|---|---|
| 1,429,811 A | 9/1922 | Tynan | |
| 1,694,089 A * | 12/1928 | Wright | 261/104 |
| 1,762,792 A | 9/1929 | Altman | |
| 1,801,794 A | 4/1931 | Broudy et al. | |
| 1,914,397 A | 6/1933 | Bender | |
| 2,575,499 A | 11/1951 | Manow | |
| 3,675,402 A * | 7/1972 | Weed | 55/496 |
| 4,334,899 A | 6/1982 | McConnell | |
| 5,117,899 A * | 6/1992 | Skimehorn | 165/48.1 |
| 5,176,570 A * | 1/1993 | Liedl | 454/309 |
| 5,462,569 A * | 10/1995 | Benjamin | 55/385.6 |
| 5,525,145 A * | 6/1996 | Hodge | 96/17 |
| 5,792,230 A | 8/1998 | Moore et al. | |
| 5,863,310 A | 1/1999 | Brown | |
| 5,947,815 A | 9/1999 | Danforth | |
| 5,964,910 A | 10/1999 | Keele | |
| 5,968,217 A * | 10/1999 | Stein et al. | 55/496 |
| 6,030,427 A * | 2/2000 | Sorice et al. | 55/480 |
| 6,310,770 B1 * | 10/2001 | Negishi | 361/695 |
| 6,716,267 B2 | 4/2004 | Lawlor, Sr. | |
| 6,749,654 B2 * | 6/2004 | Hilliard | 55/385.1 |
| 6,817,941 B1 | 11/2004 | Gatov | |
| 7,364,602 B2 * | 4/2008 | Wu et al. | 55/493 |
| 2004/0074214 A1 | 4/2004 | Henson | |

\* cited by examiner

*Primary Examiner*—Robert A Hopkins
*Assistant Examiner*—Minh-Chau T Pham

(57) ABSTRACT

An air filter housing slidably receives an air control insert therein without requiring the air filter housing to be removed from the wall, floor or ceiling surrounding an air duct. The air filter housing varies in size in at least one dimension to reduce the quantity of air filters and air filter housings required to accommodate a wide variety of air duct types and sizes. The housing is mounted to a register, diffuser or return air grill covering an air duct. The air control insert is slidably received in the air filter housing for ease of removing, cleaning or replacing. The housing is adaptable to receive a variety of inserts which are custom designed to remove specific pollutants from the air to improve the air quality in a home or office, or to block the flow of air entirely.

19 Claims, 7 Drawing Sheets

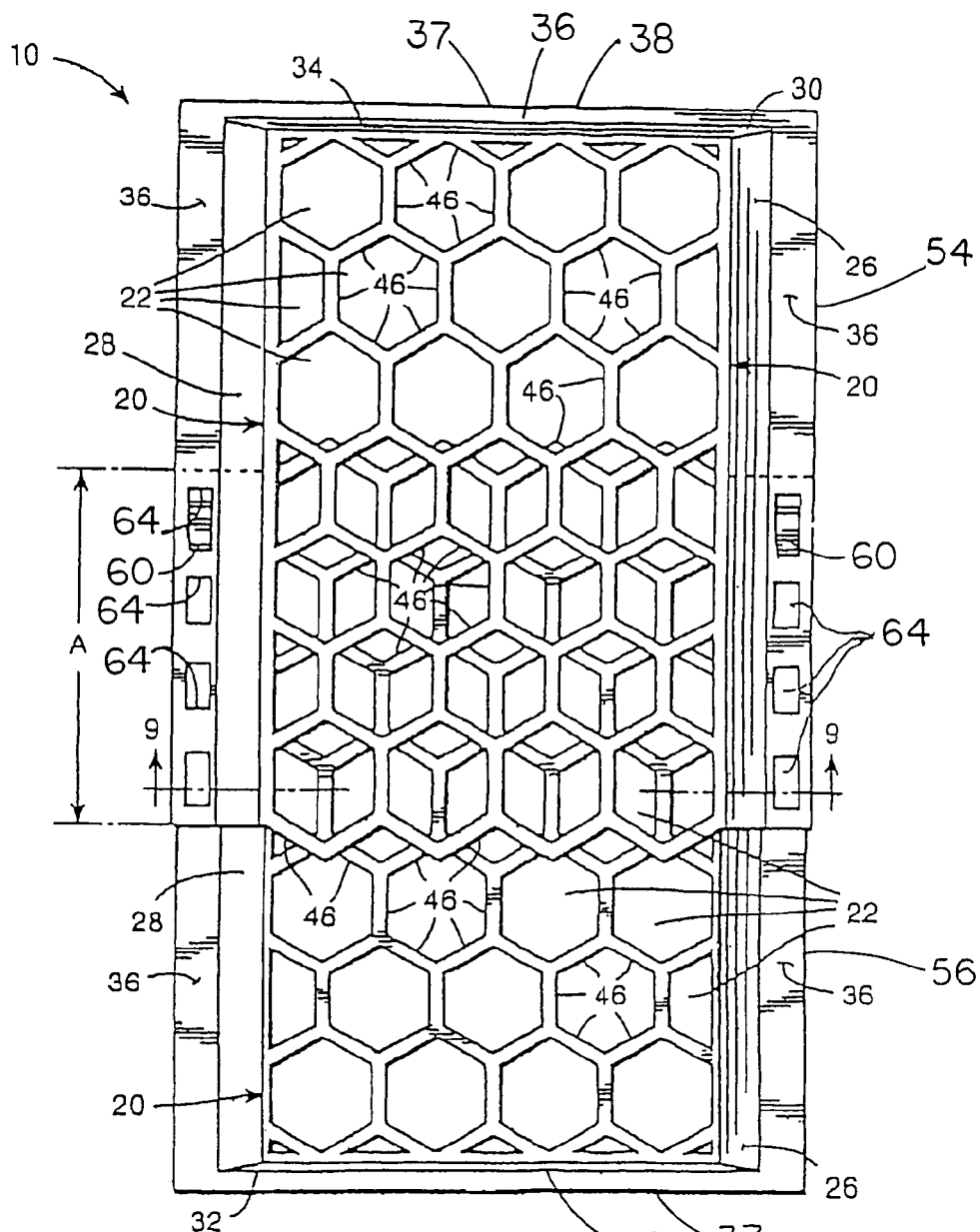
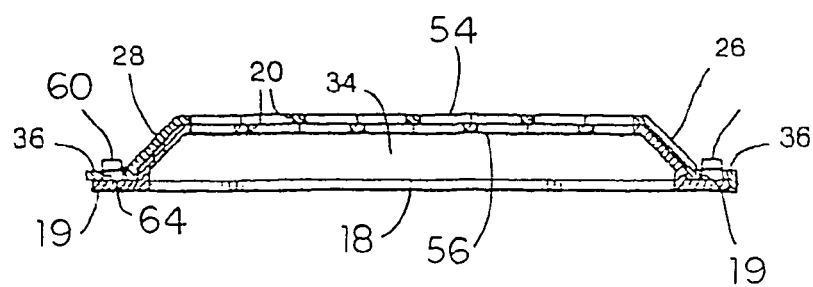
FIG. 8
FIG. 9

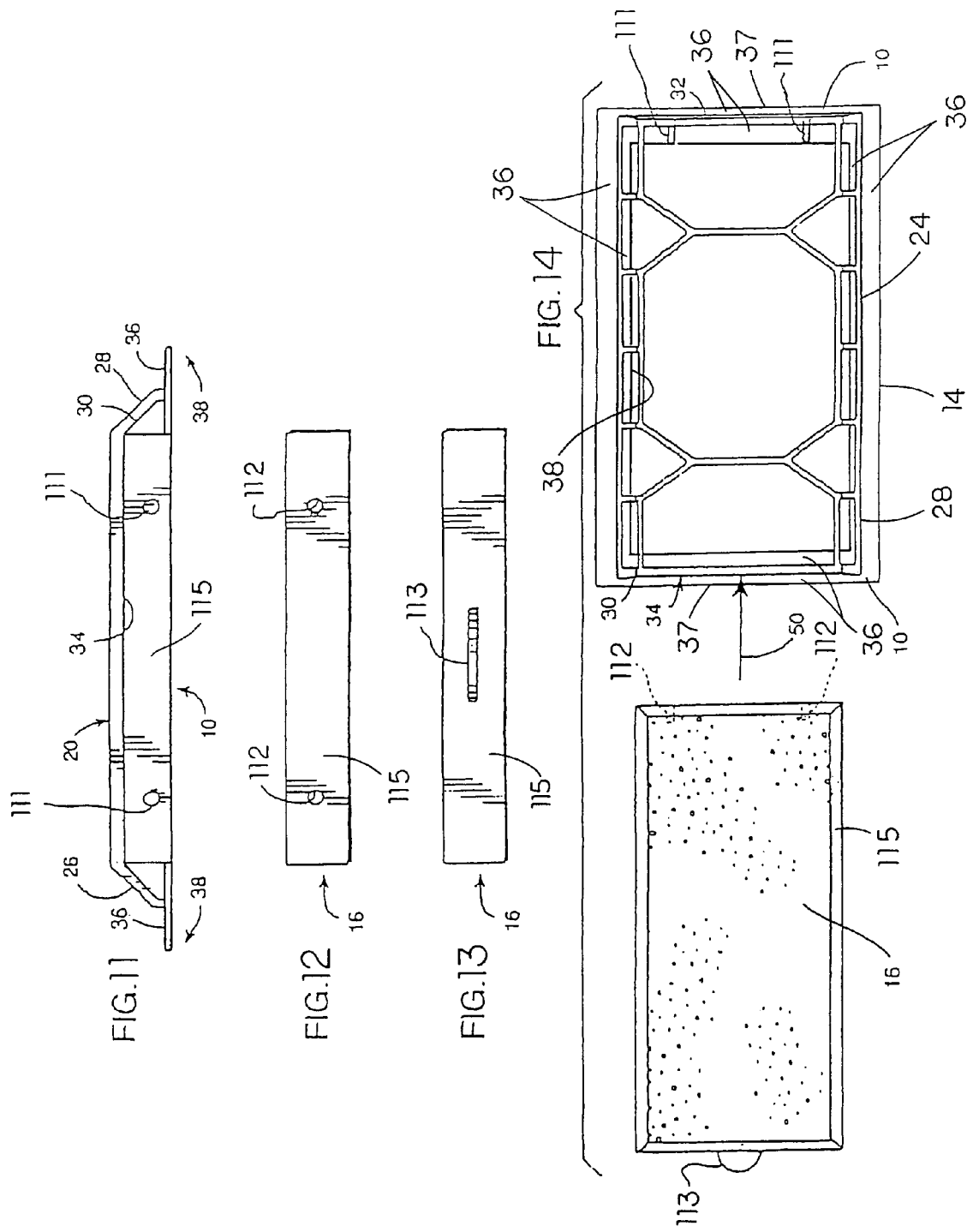

FILTER HOUSING

CROSS REFERENCE TO RELATED APPLICATIONS

This application is a continuation-in-part of provisional application Ser. No. 60/392,056, filed on Jun. 28, 2002 entitled "Filter Housing" in the name of Joseph C. Henson, and application Ser. No. 10/607,540, filed on Jun. 27, 2003 entitled "Filter Housing," now abandoned, and this application hereby claims the priority of that application and incorporates same in its entirety by reference herein.

FIELD OF THE INVENTION

The present invention relates to a filter housing for a register, diffuser, or return air grill. More particularly, the present invention relates to a filter housing which can be placed over an existing register, diffuser or return air grill, and wherein the filter is inserted between the grill and the filter housing from one side, eliminating the need to open or remove the filter housing or the grill to replace the filter.

BACKGROUND OF THE INVENTION

The benefits of air filters to remove dust, pollen and impurities from circulating air within a building are well recognized in the art. Air filters are commonly used in proximity to heaters and air conditioning units. The filtered air is typically routed through air ducts to various locations within a building, such as a home or office. It is well known that dust, pollen and other air impurities accumulate in the air delivery ducts. Thus, the filtered air is contaminated by the air impurities in the air delivery ducts, prior to being circulated in a room located in a building, such as a home or an office.

To overcome this difficulty, prior art air filters have been mounted in the air duct beneath the grill. To accomplish this, the air duct grill must be removed in order to replace the air filter. Since these air filters need to be periodically replaced or cleaned to operate efficiently, the air duct grill must be removed and reinstalled, each time the air filter is cleaned or replaced. With the filter positioned behind the grill register, it is difficult to visually determine when the filter needs changing. Prior art devices require the grill to be removed to inspect the filter, in order to determine when the filter needs changing. This is time consuming and labor intensive.

Other attempts to overcome these difficulties include grills that slide, pivot or hinge to receive the air filter. This increases the complexity of the air filter housing, increases costs, and requires a large inventory of air filters and air filter housings to fit the many sizes of air ducts found in homes and offices.

All prior art filters utilized to remove dust, pollen and impurities from circulating air within a building somewhat reduce the flow of air through the air ducts of the building. Other attempts to provide air duct filters have reduced the air flow in the ducts more than desired. Thus, a filter housing which does not reduce the air flow within the air ducts in the homes and offices in which the filter housings are utilized, or are provided with structure which actually improves the air flow through those ducts would be highly desirable.

Thus, many sizes of air filters and air filter housings must be manufactured, transported and sold, in order to accommodate the need for various sizes of air ducts. This requires additional storage and shelf space, as well as creating confusion as to which size of air filter and air filter housing are required for each air duct in a home or office.

Examples of prior art air filter housings known in the art include:

U.S. Pat. No. 5,947,815 issued to Danforth on Sep. 7, 1999. This invention discloses an air register filtering system having a frame, with an air filter enclosed within the frame. A top cover is hinged to the frame, and must be opened, to access the air filter.

U.S. Pat. No. 5,863,310 issued to Brown on Jan. 26, 1999, discloses a grill/filter mounting assembly where the grill is hinged to the duct, and must be sized to fit an existing duct.

U.S. Pat. No. 5,792,230 issued to Moore et al on Aug. 11, 1998, discloses an air register having a filter element. A pivotable retaining plate engages the face plate to retain the filter across the openings of the register.

U.S. Pat. No. 4,344,899 issued to McConnell on Jun. 15, 1982, discloses a snap on air duct filter assembly having first and second frames.

U.S. Pat. No. 2,575,499 issued to Manow on Nov. 20, 1951, discloses a slide-in fiberglass filter received in a hinged housing sized to fit an air duct.

U.S. Pat. No. 1,914,397 issued to Bender on Jun. 20, 1933, discloses a dust shield for warm air registers. This patent teaches a dust shield held in a securing means above a register.

U.S. Pat. No. 1,801,794 issued to Broudy et al on Apr. 21, 1931, discloses a register filter secured to a hot air register.

U.S. Pat. No. 1,726,792 issued to Altman et al on Sep. 3, 1929, discloses an adjustable register screen pivoted to a frame.

U.S. Pat. No. 1,694,089 issued to Wright on Dec. 4, 1928, discloses a register duct cover which is removed to gain access to a filter.

U.S. Pat. No. 1,429,811 issued to Tynan on Sep. 19, 1922, discloses a register attachment which includes a casing, a pane, and screens which are sized to fit an air duct.

SUMMARY

Thus, what is needed is a filter housing for mounting upon a register, diffuser, or return air grill, which is adapted to slidably receive an air filter therein, without requiring the air filter housing to be removed from the wall, floor or ceiling surrounding an air duct. The filter housing mounts externally on the grill.

Since the size of air ducts in homes and offices vary widely, what is also needed is an air filter housing that is adaptable to vary in size in at least one dimension to reduce the quantity of air filters and air filter housings required to accommodate a wide variety of air duct types and sizes.

What is also needed is an air filter housing for mounting to a register, diffuser or return air grill, which does not require removal of the air filter housing from the grill to remove, clean or replace the air filter.

What is also needed is an air filter housing adapted to receive a variety of air filters which are custom designed to remove specific pollutants from the air, to accommodate the needs of asthma and allergy sufferers, and to improve the air quality in a home or office. A wide variety of pollutants may be removed from the air stream, including dust, dirt, mites, mite feces, bacteria, spores, allergens, chemical odors, and general air born pollutants found in residential, commercial and industrial air duct systems. The ease of periodic replacement of air filters month by month, or season by season, is essential to the needs of such users.

The front of the filter housing should be aesthetically pleasing, and may be decoratively designed to fit a variety of home and office decor. An open face design is preferred to permit maximum air flow through the air filter.

One embodiment of the air filter housing can be utilized to actually improve the air flow through the air filter housing and those air ducts which communicate therewith.

The air filter housing can be manufactured using a high impact plastic material in a selected color to match or contrast with the interior decor. Alternately, the filter housing can be translucent or transparent to suit user preference.

Another embodiment will also accept a blocking air control insert to block smoke, toxic micro-organisms or other harmful materials from passing through the register.

The present invention does not impede the operation of the register, diffuser, or return air grill unless a blocking air control insert is used. The register control, typically a slidable lever used to adjust the air flow through the register, is left uncovered by the air filter, or the air filter may be slidably moved to provide unrestricted manual adjustment of the register control.

BRIEF DESCRIPTION OF THE DRAWINGS

The above mentioned and other features and objects of the invention and the manner of obtaining them will become more apparent and the invention itself will be better understood by reference to the following description of embodiments of the invention when taken in conjunction with the accompanying drawings wherein:

FIG. 8 is top elevational view of an adjustable length filter housing utilizing a honeycomb design, which is expandable in one direction to accommodate a variety of grill sizes;

FIG. 9 is a cross-sectional view of the air filter housing taken along lines 9-9 in FIG. 8 showing a first end slidably received in relation to a second end to adjustably fit the air filter housing to a variety of air duct sizes;

FIG. 11 is a first end elevational view of a further embodiment of a filter housing similar to FIG. 1 and wherein like numerals indicate like parts, showing an opening provided in the first side to slidably receive and position an air filter within the filter housing, without removing the filter housing from the air duct;

FIG. 12 is an end elevational view of a further embodiment of a filter which is similar to the filter of FIG. 7, and having two apertures therein for use with the filter housing of FIG. 11;

FIG. 13 is an end elevational view of the filter of FIG. 12 for use with the filter housing of FIG. 11;

FIG. 14 is an assembly view of a top elevational view of the filter housing of FIG. 11, which is similar to FIG. 1 and wherein like numerals indicate like parts, showing a blocking air control insert or an air filter positioned for insertion into the opening provided in the filter housing;

DESCRIPTION OF THE ILLUSTRATIVE EMBODIMENTS

Figure 1:
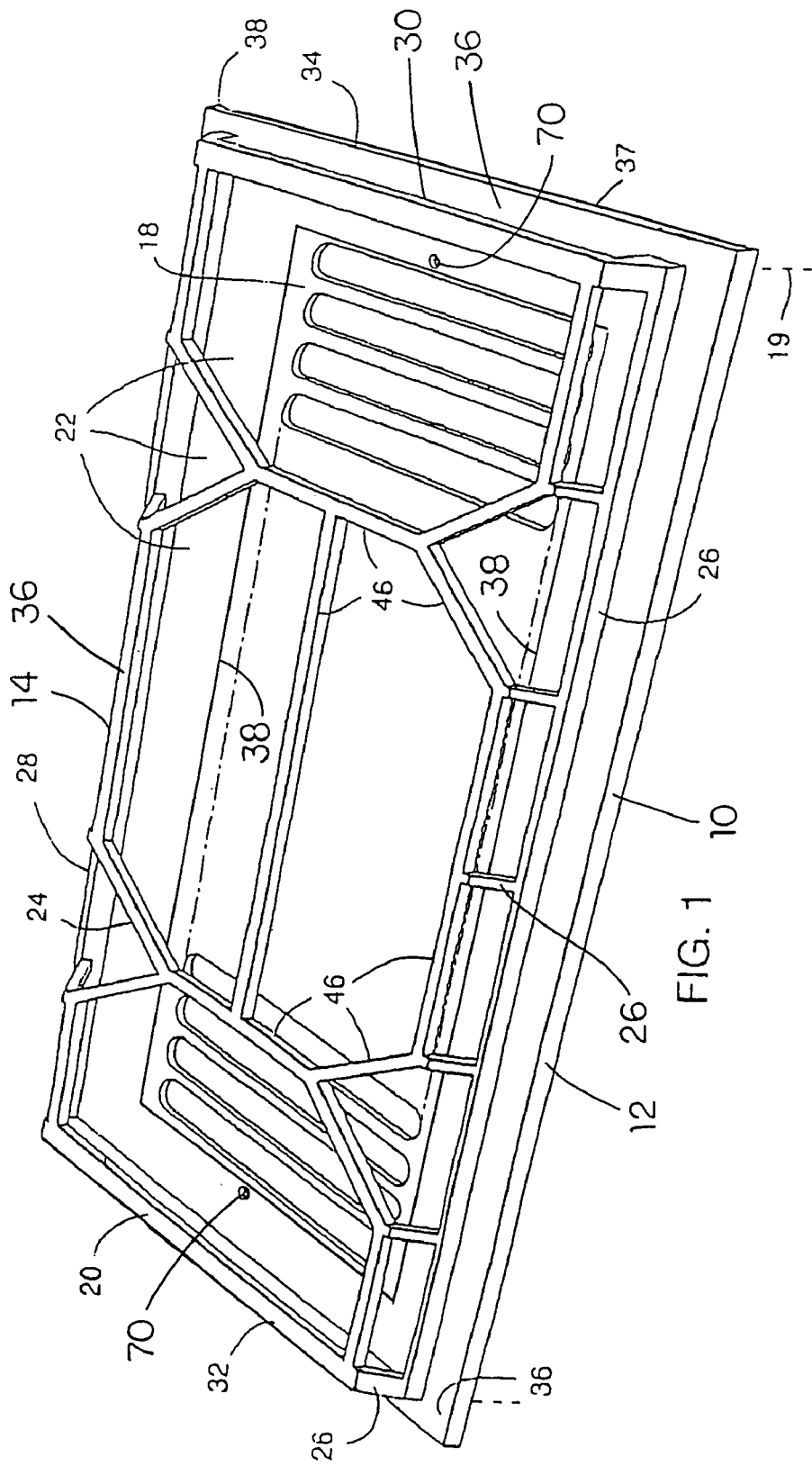
FIG. 1 is a perspective view of a filter housing mounted on an existing grill according to the present invention having a fixed length and width.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

FIG. 1 through FIG. 7 and FIG. 10A show details of an air filter housing 10 having a fixed length and width designed to fit a specific air duct size. FIG. 8, FIG. 9 and FIG. 10B show details of an adjustably sized air filter housing 10 having a first side portion 54 slidably received in relation to a second side portion 56 to vary the length of the air filter housing 10 at assembly in order to adapt the air filter housing to fit a variety of air duct sizes.

As shown in FIG. 1, the air filter housing 10 includes a top portion 20 having a plurality of shaped apertures 22 forming a design pattern 24 thereon and raised over a flange 36 having a centrally located aperture 38 therein. Top 20 is larger than aperture 38 and generally covers aperture 38. Aperture 38 is generally the same size or larger than the opening in the existing grill 18 or duct 19. The shaped apertures 22 preferably extend along the top portion 20 and first and second side portions 26, 28. It is also within the scope of this disclosure to limit the shaped apertures 22 to the raised top portion 20 only.

Figure 4:
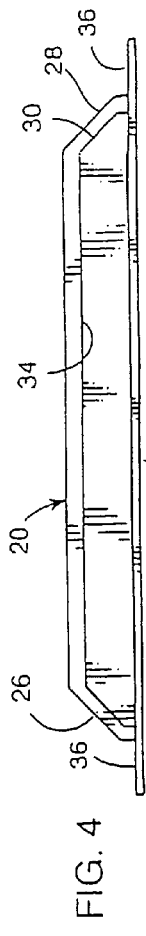
FIG. 4 is a first end elevational view of the filter housing of FIG. 1, showing an opening provided in the first side to slidably receive and position an air filter within the filter housing without removing the filter housing from the air duct.
Figure 5:
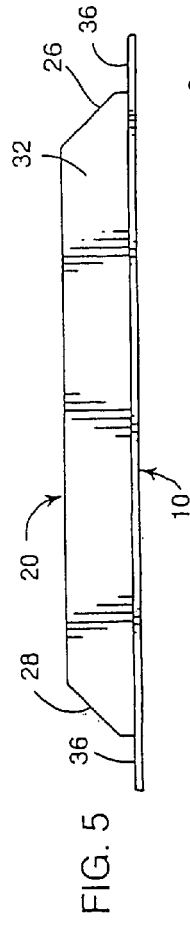
FIG. 5 is an end elevational view showing the second end of the filter housing of FIG. 1.

A first end portion 30 has an elongated filter aperture 34 sized to slidably receive an air control insert or filter 16 therethrough as shown in FIG. 4. A second end portion 32 may also include shaped apertures 22, or may be of solid construction, to suit manufacturing preference as shown in FIG. 5. While the elongated filter aperture 34 is shown positioned in the first end portion 30, it is well within the scope of this disclosure to position the elongated filter aperture 34 on either the first or second side portions 26, 28 or first or second end portions 30, 32 to suit manufacturing preference, and such variations are intended to fall within the scope of this disclosure and the following claims.

The first and second side portions 26, 28 are preferably inclined from the raised top portion 20 to a flat side flange portion 36, which extends outwardly from the respective first and second side portions 26, 28 to cover a new or existing grill 18, which in turn covers an air duct 19 opening. The flat flange end portions 37 preferably also extend from the first and second end portions 30, 32 to entirely cover the outer periphery of the new or existing grill 18.

A suitable mounting fastener (not shown) may be used to secure the filter housing 10 to the grill 18. A mounting aperture 70 may optionally be provided for alignment with a mounting aperture in the grill 18, for example. Thus, no additional drilling is required to mount the air filter housing 10 to a new or existing grill 18. The mounting bracket may extend inwardly from the first and second end portions 30, 32 and the mounting brackets may be entirely covered by the air filter 16 when the air control insert or filter 16 is mounted in the air filter housing 10. Thus, no mounting fastener is visible when the air control insert or filter 16 is positioned within the air filter housing 10; yet easy access to the mounting fastener is provided when the air filter 16 is removed.

As seen in FIG. 1, the air filter housing 10 is positioned over a new or existing grill 18. FIG. 2 is a top elevational view of the air filter housing 10. The shaped apertures 22 are formed by a plurality of ribs 46, which form the design pattern 24 shown in FIG. 2. It is well within the scope of one of average skill in this art to position straight or curved ribs to form any number of design patters 24 on the raised top portion 20 if the air filter housing 10 and all such design patterns 24 are intended to fall within the scope of this disclosure and the following claims. FIG. 2B shows a plurality of honeycomb shaped apertures 22 formed by the plurality of ribs 46 in a second example of the embodiment of the air filter housing 10.

The plurality of ribs 46 are positioned to retain an air control insert or filter 16 beneath the raised top portion 20, while preferably providing maximum air flow through the air control insert filter 16. The ribs 46 may be curved, angled, or straight to suit design and manufacturing preference.

This invention provides for visible inspection of the air control insert or filter 16 without requiring removal of the air control insert or filter 16 from the air filter housing 10. When the air filter 16 requires changing, the air control insert or filter 16 may be removed through the filter aperture 34 without removing the air filter housing 10.

Figure 2A:
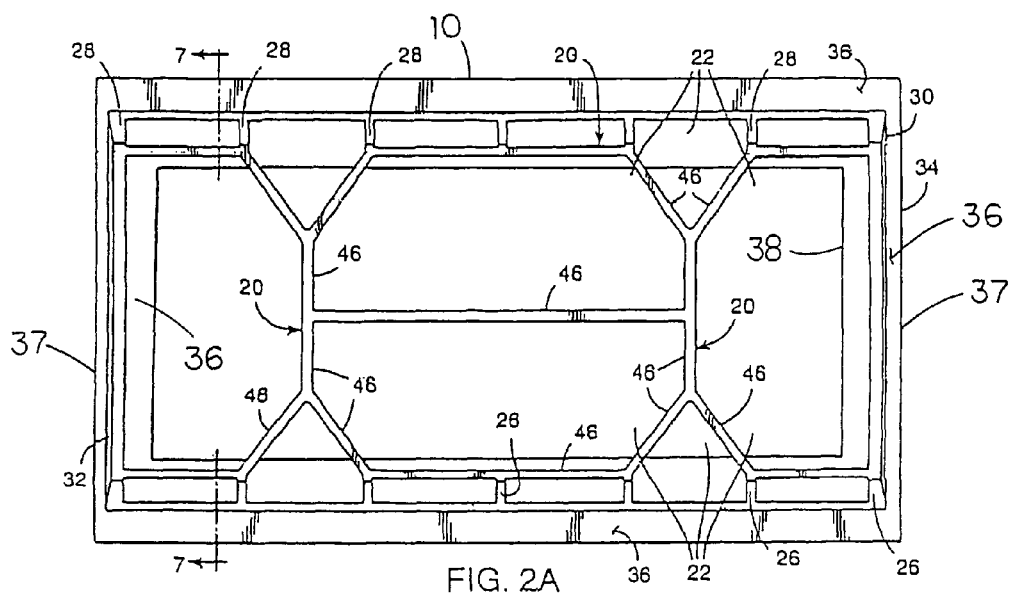
FIG. 2A is a top elevational view of the filter housing of FIG. 1.
Figure 2B:
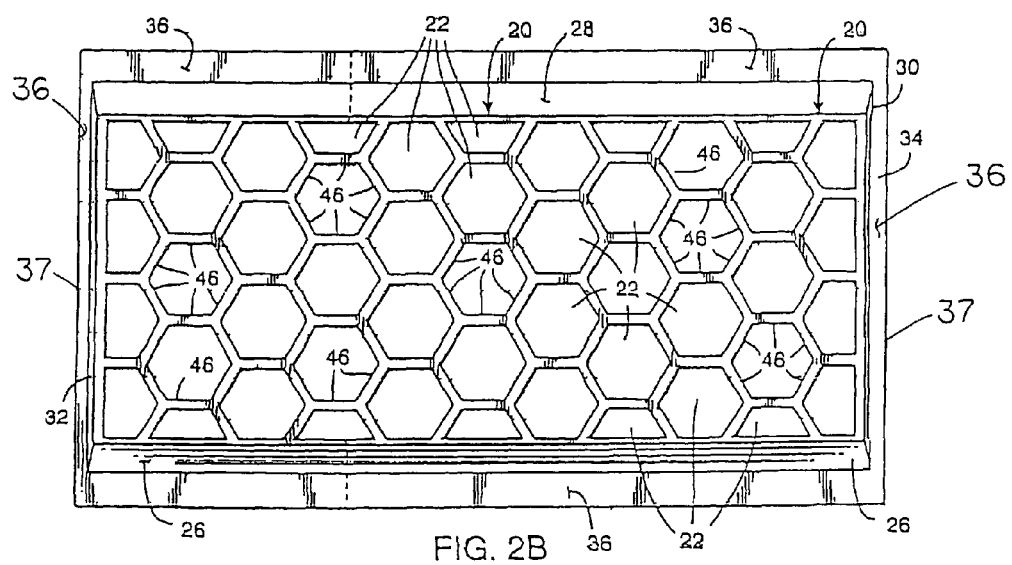
FIG. 2B is a top elevational view of the filter housing utilizing a honeycomb design having a fixed length and width.
Figure 3:
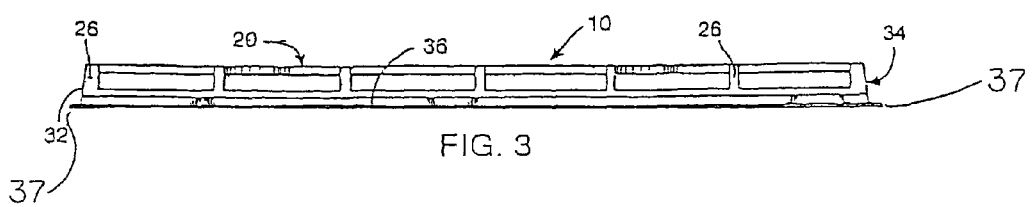
FIG. 3 is a side elevational view of the filter housing of FIG. 1.

FIG. 3 is a side elevational view of the first side portion 26 of the air filter housing 10 shown in FIG. 2A. In this view, the shaped apertures 22 extend along the first side portion 26. The height of the first side portion 26 between the raised top portion 20 and the surrounding flange 36 is selected to enable the air control insert or filter 16 to be slidably received therein. The second side portion 28 is preferably similar in size and shape to the first side portion 26, and thus is not separately illustrated herein.

FIG. 4 is an end view of the first end portion 30 showing the elongated filter aperture 34 positioned therein. The elongated filter aperture 34 is sized to slidably receive an air control insert or filter 16 therethrough.

FIG. 5 is an end view of the second end portion 32. In this view, the second end portion 32 is of solid construction. However, it is within the scope of this disclosure to extend the shaped apertures 22 to extend along the second end portion 32.

Figure 6:
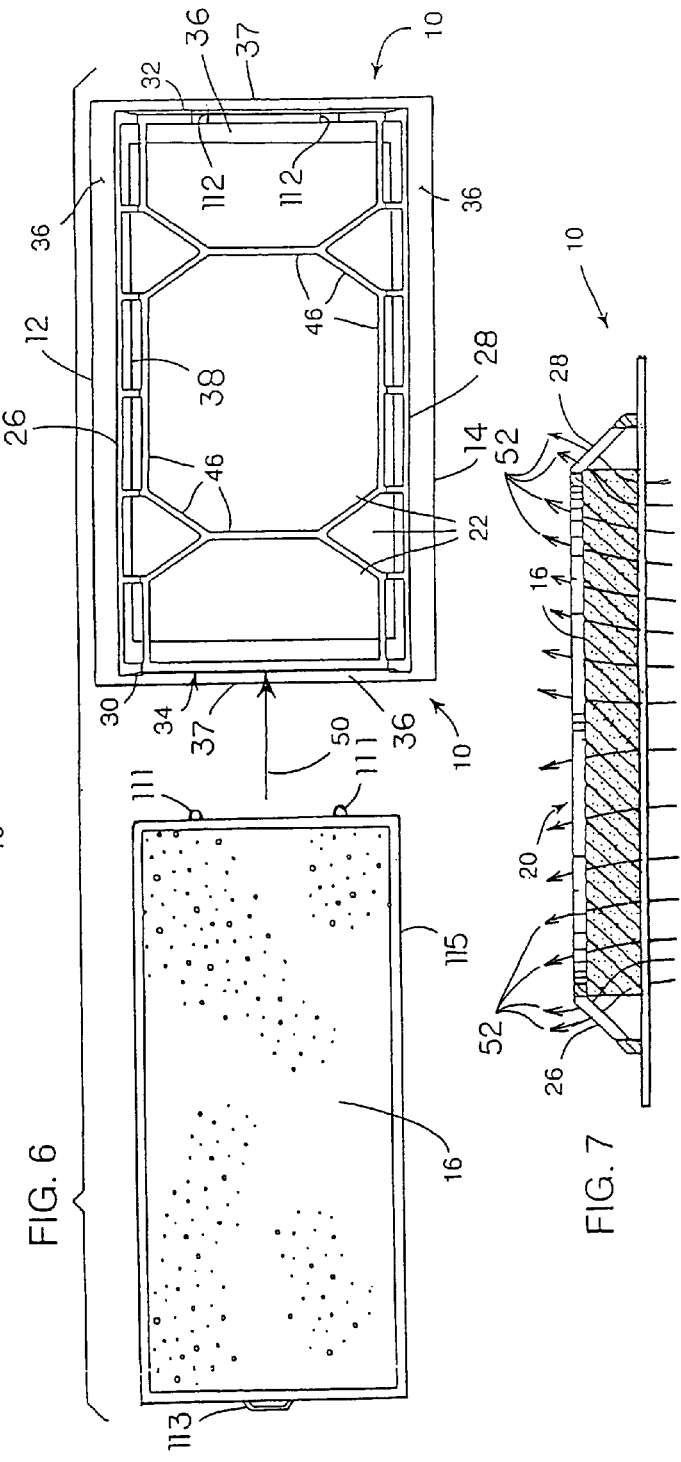
FIG. 6 is an assembly view of a top elevational view of the filter housing of FIG. 1 showing the a blocking air control insert or an air filter positioned for insertion into the opening provided in the filter housing.

FIG. 6 is an exploded view of the air filter housing 10 with the air control insert or filter 16 positioned to be slidably received through the elongated filter aperture 34, as shown by arrow 50. The elongated filter aperture 34 enables the user to slidably position an air control insert or filter 16 within the filter housing 10 without removing and replacing the air filter housing 10 over the air duct. This greatly simplifies the removal and replacement of an air control insert or filter 16, which must be done periodically to maintain the efficiency of the air control insert or filter 16. Depending upon the type of air control insert or filter 16 used, removal and replacement may be required monthly to effectively filter the air. Many current air filter designs require the user to unscrew and lift us the grill 18 to position an air filter within the air duct. Since there are numerous air ducts in a conventional building, this requires considerable time and effort.

Applicant's invention greatly simplifies the removal and installation of an air control insert or filter 16 by slidably receiving the air control insert or filter 16 through the air filter aperture 34 located at one end of the air filter housing 10. The air filter housing 10 is not removed from the air duct to replace the air control insert or filter 16, thus no tools are required for replacing the air control insert or filter 16 and the time required for changing air control inserts or filters 16 is greatly reduced.

Figure 7:
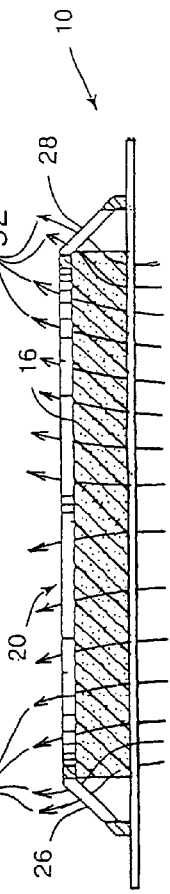
FIG. 7 is a cross-sectional view of the filter housing showing the filter installed within the filter housing taken substantially along section line 7-7 of FIG. 2A.

FIG. 7 is a cross-sectional view of the air filter housing 10 taken along lines 7-7 in FIG. 2 with the air control insert or filter 16, installed in the filter housing. As shown in FIG. 7, the air control insert or filter 16 is positioned within the air filter housing 10, to filter or block the air passing through the new or existing grill 18.

FIG. 7 shows the pathway of air through the air filter 16 and the filter housing 10 by use of the arrows 52. It can be seen that additional filter area is provided over and above the area of the opening 38 for the air to flow by the filter 16. The filter 16 has a bottom area which is slightly larger than the area of the opening 38. Whereas depending upon the dimensions of the filter 16, the total area of the sides, ends and top of the filter when summed may exceed the area of the bottom of the filter by 50% or more. Thus, the controlling area for the flow of air through the filter housing 10 is the size or area of opening 38. Neither the filter housing 10 nor the filter 16 further restrict the air flow through the original grill 18 or duct 19.

FIG. 8 is a front elevational view of the expandable air filter housing 10, showing the first housing portion 54 and the second housing portion 56 slidably positioned in relation to each other to cover various lengths of new or existing grill 18. Arrows "A" show the adjustable range of the first and second housing portions 54, 56. Preferably, the adjustable range is plus or minus several inches, to accommodate, by way of example, a grill size of ten to fourteen inches. This reduces the numerous sizes of air filter housings 10 required, simplifying the stocking and displaying of multiple air filter housings.

As shown in a cross-sectional view in FIG. 9, the first housing side portion 54 is sized to be slidably received in relation to the second housing side portion 56. This requires the first housing portion 54 to be slightly larger than the second housing side 56. Of course, the second housing side portion 56 could be adapted to be slidably received within the first housing side portion 54, and all such adaptations are intended to fall within the scope of this disclosure and the following claims.

Preferably, the first housing side portion 54 and the second housing side 56 slidably expand to cover a grill at least 14 inches in length, and further slidably retract to cover a grill ten inches or less in length.

As shown in FIGS. 9 and 10B, a tab 60 may be positioned on the first housing side portion 54. The tab 60 is received in a selected tab aperture 64 positioned through the second housing side portion 56. The tab 60 includes a tip 66 which slidably engages the flat side flange portion 36 at the edge of tab aperture 64 to retain the second housing side portion 56 in one of the selected tab apertures 64 positioned in spaced alignment on the flat side flange portion 36 of the second housing side 56. This allows the air filter housing 10 to incrementally expand or contract to suit an existing grill 18 covering an existing air duct opening.

Figure 10A:
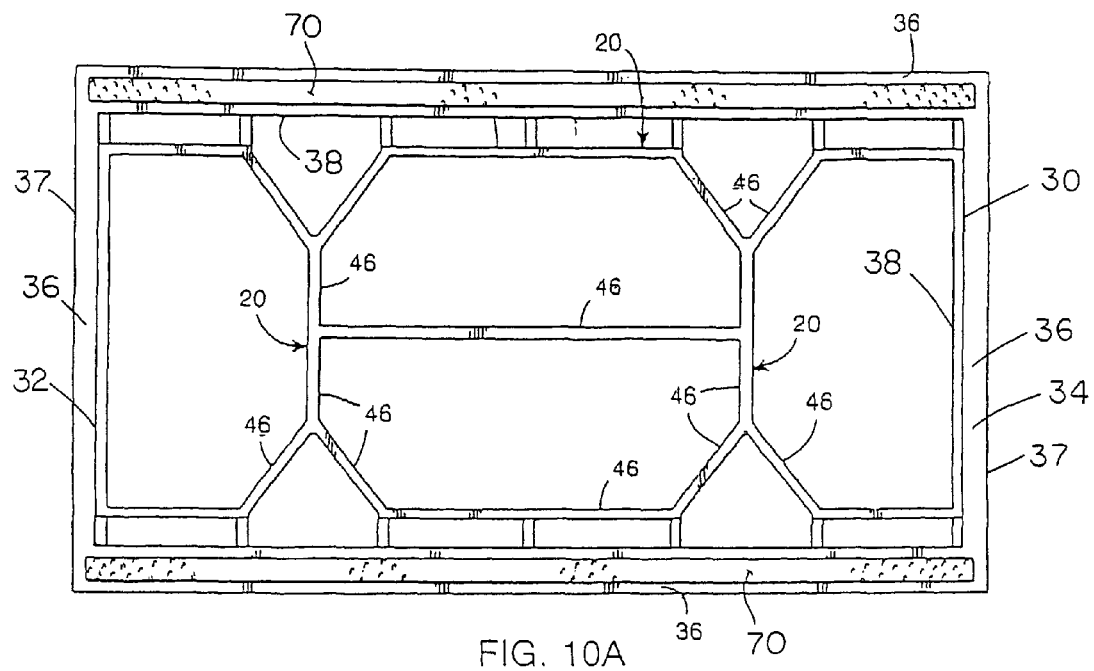
FIG. 10A is a bottom view of the filter housing showing a releasable securement means to secure the filter housing to an opening in an air duct.
Figure 10B:
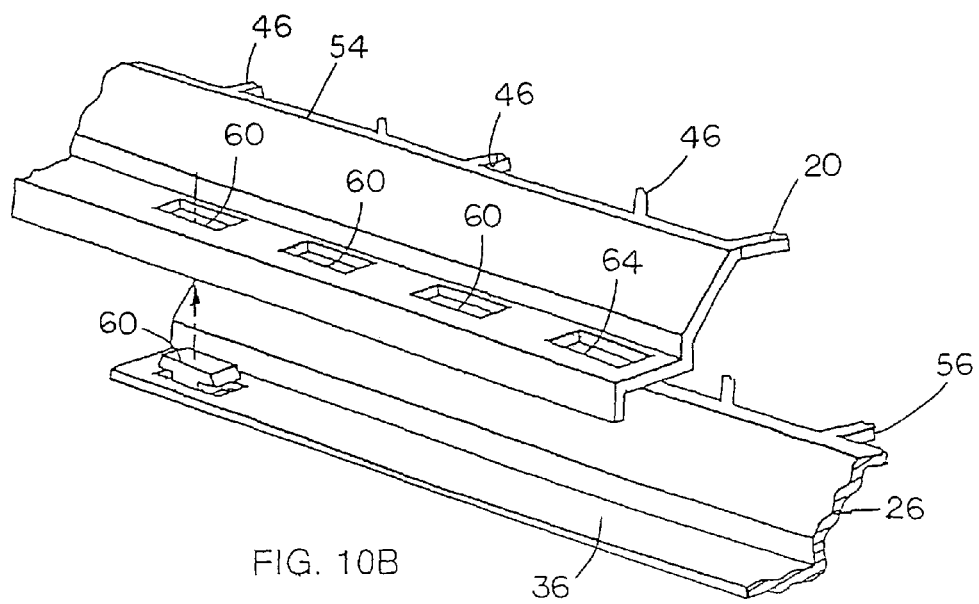
FIG. 10B is a partial perspective view of a tab positioned on a lower portion to be received and secured in a selected one of several openings located on an upper portion of the adjustable length grill shown in FIG. 8.

As shown in FIG. 10A, the air duct housing may be secured to the grill 18 with a suitable fastening means 70, such as a hook and loop fastener, or two sided adhesive.

The filter housing 10 may be sized to be externally mounted upon a new or existing grill or register 18, which is typically secured about an air duct 19, located in a floor, wall or ceiling (not shown). Alternatively, the filter housing 10 may be mounted directly upon the air duct 19, eliminating the need for using a new or existing grill register 18. The new or existing grill or register 18 serves to retain the air control insert or filter 16 between the register 18 and the raised top portion 20 of the air filter housing 10.

The air filter housing 10 is preferably sized to hold air filters 16 of varying types and density to suit the needs of the user. The filter housing 10 is preferably affixed to the front face or grill 18 of a wall register, floor diffuser, gravity register, or return air grill to accommodate most types of air ducts 19 which circulate air within a room, home or office. Such air ducts 19 are typically rectangular or square in shape and come in a variety of lengths and widths. The air filter housing 10 disclosed herein slidably receives the air control insert or filter 16 from one of the sides 26, 28 or ends 30, 32 of the housing 10, eliminating the need to pivot or remove the air filter cover or housing 10 to access the air control insert or filter 16 as disclosed in the prior art.

The length of most residential and office type air register ducts 19 varies from ten inches to fourteen inches in length. The width of most air register ducts 19 varies from six inches to ten inches in width. While individual filter housings 10 may be made to suit each size and shape of air register duct 19, this invention allows several sizes to be adapted to fit most air duct 19 sizes.

The present air filter housing 10 is preferably externally secured to the air duct grill 18. Thus, the width of the grill 18 may be larger than the size of the air duct 19. For example, an eight inch width of housing 10 can easily accommodate air duct 19 width having a size of six inches to eight inches. Likewise, a ten inch width of housing 10 can easily accommodate air duct 19 sizes of eight inches to ten inches in width.

In one example embodiment, air ducts 19 having a width of six inches to ten inches, and a length of ten inches to fourteen inches may be accommodated with just one or two sizes of air filter housing 10. Applicant's invention may alternately be adapted to other widths and lengths to suit new and existing air duct 19 sizes and such adaptations are intended to fall within the scope of this disclosure and the following claims.

The length of the air filter housing 10 may be adjustably sized as shown in FIGS. 8 and 9 to accommodate a variety of air duct 19 lengths. In this embodiment, the first side portion 54 is slidably received in relation to the second side portion 56 to adjust the air filter housing 10 to suit multiple of lengths of existing air duct 19 sizes. For example, where the first side portion 54 and the second side portion 56 are each greater than one-half the length of air duct 19, the air filter housing 10 can expand to cover the air duct 19 opening. Since most air duct 19 openings in a home or office are sized from ten to fourteen inches in length, all such sizes can be accommodated with an air filter housing 10 which slidably expands to cover the fourteen inch air duct 19 size, and slidably retracts to cover the ten inch air duct 19 size. The adjustment length is shown in FIG. 8 as arrow "A."

This greatly simplifies the number and sizes of air filter housings 10 required to accommodate most home and office air duct 19 sizes. The slidable air duct housing 10 disclosed herein further simplifies the stocking of air control inserts or filters 16. The width of the air control inserts or filters 16 can be standardized and the length of the air control inserts or filters 16 can be limited to a few specific lengths selected to be from ten inches to fourteen inches in length.

Where air control inserts or filters 16 are located in the air duct 19 behind the grill 18, the air filters must be sized to be closely received within the air duct 19. As previously mentioned, this greatly increases the quantity of sizes required to fit a variety of homes or offices.

Applicant's invention preferably mounts the air filter housing 10 externally of the grill 18, allowing the air control insert or filter 16 to be somewhat larger than the opening of the air duct 19. This greatly reduces the quantity of sizes required to fit most air ducts 19, thus reducing stocking costs, shelf space, transportation costs, and consumer confusion as to which size to purchase.

Preferably, as shown in FIG. 14, the filter is surrounded by a rigid frame 15 which surrounds the outer periphery of the air control insert or filter 16. FIG. 11 is a first end elevational view of a further embodiment of a filter housing similar to FIG. 1 and wherein like numerals indicate like parts, showing an opening 34 provided in the first side to slidably receive and position an air filter within the filter housing without removing the filter housing from the air duct. Inasmuch as like numerals indicate like parts with the previous embodiments, a description of those like elements is omitted. FIGS. 6, 11 and FIGS. 12, 14 additionally show a pair of pins 111, 111 on housing 10 or filter frame 115 which are adapted to be frictionally received in corresponding bores 112 in filter frame 115 or housing 10, respectively to hold the frame 115 in position.

FIG. 12 is an end elevational view of a further embodiment of a filter frame 115 which is similar to the filter frame 15 of FIGS. 6 and 11, and having two apertures or bores 112 therein for use with the housing of FIG. 14. Inasmuch as like numerals indicate like parts with the previous embodiments, a description of those like elements is omitted. The air control insert or filter 16 further may incorporate a pair of bores 112, 112 which are adapted to receive the pins 111, 111 of housing 10 as shown in FIG. 14. This permits a positive, secure locking or mating engagement between the housing 10 and the air control insert or filter 16 so that the air control insert or filter 16 does not vibrate, rattle, or come loose during use.

FIG. 13 is an end elevational view of the filter of FIG. 12 for use with the filter housing of FIG. 11. A tab 113 is visible in this view for permitting installation and removal of the air control insert or filter 16 and may include a securement means such as a screw, pin, or other fastener for securement of the air control insert or filter 16 to a register or to the filter housing.

FIG. 14 is an assembly view of a top elevational view of the filter housing of FIG. 11, which is similar to FIG. 1 and wherein like numerals indicate like parts, showing the air filter positioned for insertion into the opening 34 provided in the filter housing. The pins 111, 111 and the apertures 112, 112 are also shown in this view.

A solid barrier insert 16 may alternatively be used instead of an air filter 16 in an emergency to block contaminated air (not shown) from entering the room. The solid barrier insert 16 would be of the same dimensions as filter 16 and manually inserted in the filter housing 10 in the same manner as filter 16 to block smoke, toxic micro-organisms or other harmful elements in an emergency.

Figure 15:
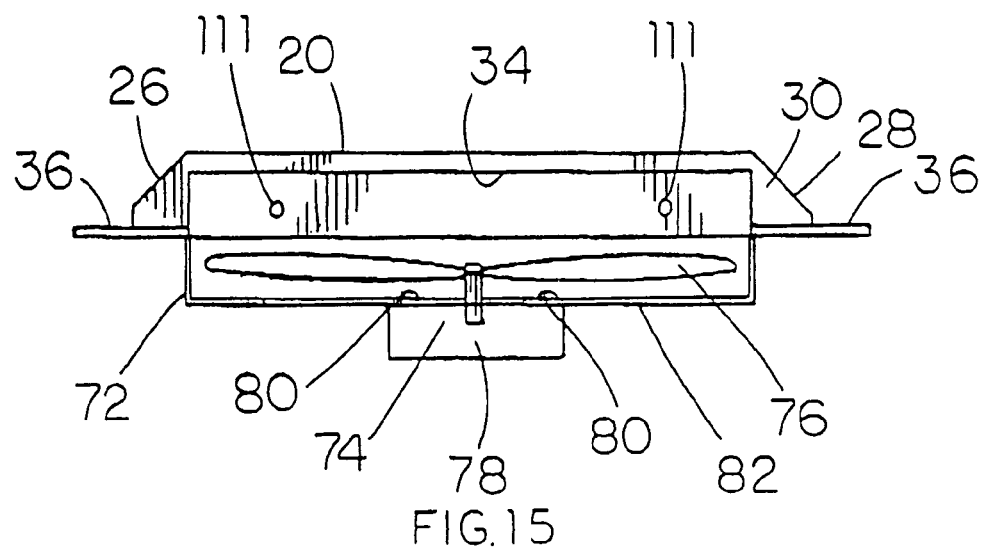
FIG. 15 is an end elevational view of a further embodiment of a filter housing shown in FIGS. 1-7 having a fan compartment which depends from the filter housing into the air duct on which it is mounted.
Figure 16:
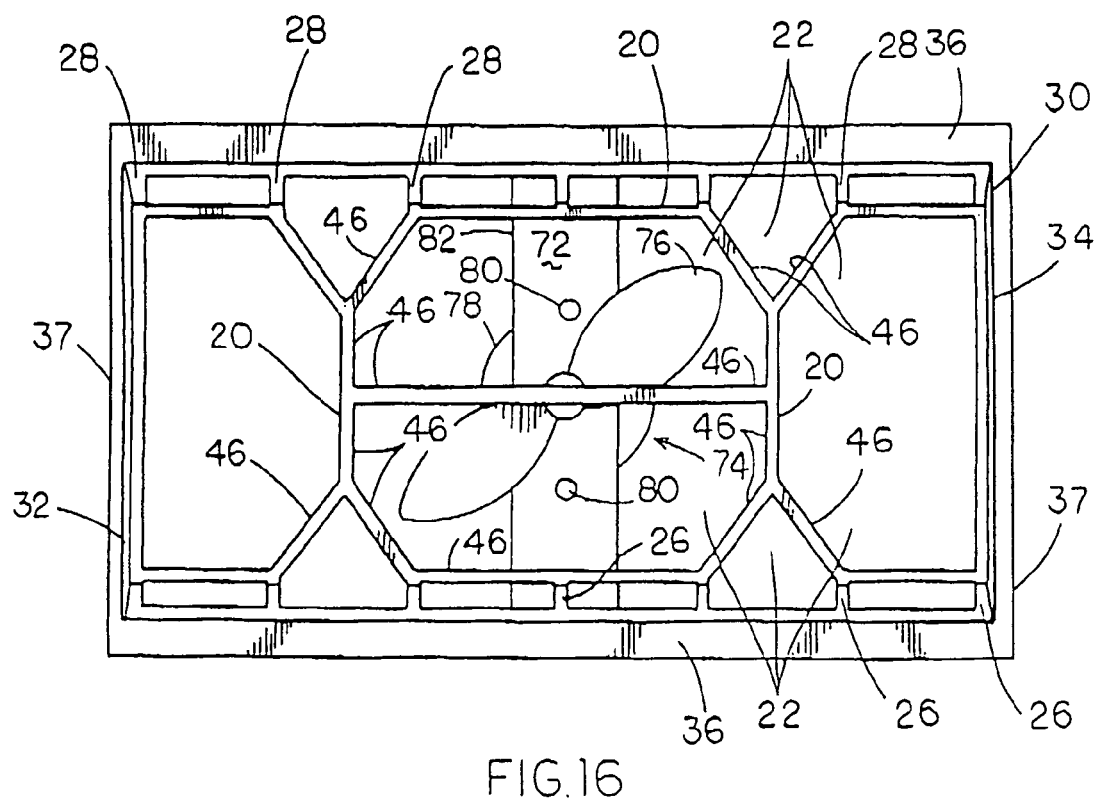
FIG. 16 is a top view of the filter housing shown in FIG. 15.

FIG. 15 is an end view and FIG. 16 is a top view of the filter housing of FIGS. 1-7 wherein like numerals indicate like parts, showing an additional fan compartment 72 secured to the bottom of the filter housing and depending therefrom. Within the fan compartment is a fan blade 76 and secured to the structural member 82 of the fan compartment is a motor 78 of the fan 74 by means of fasteners 80. This modified filter housing of the invention would be utilized with an air duct in which the existing grill 18 is removed such that both the fan compartment 72 and the fan motor 78 are positioned within the air duct.

By this embodiment, the fan 74 can be utilized to supplement the air flow through the air duct and to actually increase the air flow through the filter housing of the invention.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A filter housing having a raised top portion with a plurality of shaped apertures therein for mounting on an existing air duct or an air duct grill register, said filter housing having a first end portion and a second end portion opposite said first end portion and two side portions connecting said first and second end portions and defining a space between said top portion and said existing duct or grill in which an air control insert can be positioned and a bottom opening about the same size and shape of said existing air duct or air duct grill register, said first end portion having an opening therein adapted to slideably receive said air control insert in said space, said air control insert forming a seal between said existing air duct or air duct grill register and said raised top portion of said filter housing whereby air from said existing duct or air duct grill register can be exhausted through said plurality of shaped apertures and said air duct control insert, wherein the filter housing mounts externally on the air duct or air duct grill register.

2. The filter housing of claim 1 wherein said air control insert is a sheet of an air permeable filter material.

3. The filter housing of claim 1 wherein said air control insert is a sheet of non-air permeable material.

4. The filter housing of claim 1 wherein a rigid perimetral frame surrounds the ends and sides of said air control insert, which is designed to filter air passing through the grill.

5. The filter housing of claim 1 wherein said shaped apertures extend along the top portion of said filter housing and along said side portions of said filter housing.

6. The filter housing of claim 4 wherein said second end portion of said housing and said rigid frame have fasteners thereon chosen from the group of fasteners consisting of spaced apart and generally parallel bores and pins.

7. A filter housing for receiving an air control insert comprising a filter housing having a raised top portion having a plurality of shaped apertures therein, a first end portion, a second end portion opposite said first end portion, and a pair of opposite slide portions connecting said first and second end portions, said first end portion being adapted to slideably receive an air control insert therein between said opposite end portions and opposite side portions of said filter housing, said opposite side portions being received by each other to vary the length of said filter housing when assembled and expand or contract it and adapt said housing to a variety of air duct sizes.

8. The filter housing of claim 1 wherein the shaped apertures extend along the top portion and the first and second side portions.

9. The filter housing of claim 8 wherein the second end portion also includes shaped apertures.

10. A filter housing and an air control insert in combination, comprising a filter housing having a raised top portion with a plurality of shaped apertures therein, a first end portion, a second end portion opposite said first end portion and two side portions connecting said first and second end portions, said first end portion being adapted to slideably receive an air control insert between said first and second end portions and said first and second side portions; an air control insert having a rigid frame surrounding the outer periphery of said insert, said frame having a plurality of spaced apart bores therein, said second end portion of said filter housing having a pair of spaced apart pins extending therefrom adapted for frictional engagement with said bores in said filter which is inserted in said frame, wherein said combination is mounted externally on said grill register.

11. The filter housing of claim 10 wherein said air control insert comprises an air filter within said frame to remove from said air passing therethrough smoke, micro-organisms, air pollutants and allergens therefrom and otherwise improve the quality of the air passing therethrough.

12. The filter housing of claim 11 wherein said air control insert blocks the flow of air through said filter housing entirely, said insert being not permeable to air flow.

13. The filter housing of claim 11 wherein the shaped apertures extend along the top portion and the first and second side portions.

14. The filter housing of claim 11 wherein the second end portion also includes shaped apertures.

15. The filter housing of claim 1 having a fan compartment depending therefrom, said fan compartment being centrally located between said end portions and said side portions, a fan having a motor and a fan blade, said fan blade being within said fan compartment, said fan motor secured to the outside of said compartment and depending from said fan compartment.

16. The filter housing of claim 15 wherein said fan compartment and said fan motor are positioned within an air duct on which said filter housing is mounted.

17. The filter housing of claim 16 wherein said fan compartment and said fan motor are positioned within an air duct on which said filter housing is mounted.

18. The filter housing of claim 11 wherein said fan compartment and said fan motor are positioned within an air duct on which said filter housing is mounted.

19. The filter housing of claim 7 wherein the housing is externally mounted on an air duct or air duct grill register.

* * * * *